Patented Nov. 21, 1939

2,180,772

UNITED STATES PATENT OFFICE 2,180,772

TRIFLUOROMETHYL BENZALDEHYDES

Otto Scherer, Frankfort-on-the-Main, Germany, assignor to General Aniline Works, Inc., New York, N. Y., a corporation of Delaware No Drawing. Application October 20, 1936, Serial No. 106,695. In Germany October 25, 1935

4 Claims. (Cl. 260—599)

The present invention relates to benzaldehydes containing trifluoromethyl groups and more particularly to compounds corresponding with the following general formula:

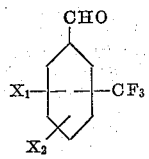

wherein $X_1$ stands for hydrogen, halogen or the trifluoromethyl group and $X_2$ for hydrogen or halogen.

Benzaldehydes containing trifluoromethyl groups have not been described in literature, probably because it is not possible to transform benzene containing trifluoromethyl groups, or homologues or substitution products thereof, into the corresponding benzaldehydes by the known methods.

I have found that trifluoromethyl-substituted benzaldehydes are obtainable by treating at a raised temperature (about 80° to about 150° C.) with concentrated sulfuric acid a benzalfluoride having one or more trifluoromethyl groups as substituents and corresponding with the general formula:

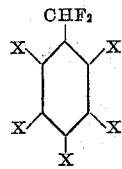

wherein at least one X represents a $CF_3$-group and the other X's mean hydrogen or a substituent.

Thereby, the $CHF_2$-group is saponified to the aldehyde group, whereas the fluorine escapes in the form of hydrogen fluoride. The fact that the concentrated sulfuric acid saponifies only the $CHF_2$-group without affecting one of the $CF_3$-groups present is surprising for the reason that the latter are in general not stable towards hot concentrated sulfuric acid and are saponified to carboxylic acid groups.

The trifluoromethyl-benzalfluorides used as starting material may be obtained from polymethylbenzenes and the substitution products thereof; these compounds may be chlorinated, for instance, by the processes described in German Patent 360,414 or in the U. S. Patent No. 2,121,330 granted to Otto Scherer, Willy Schumacher and Fritz Müller for: Benzene derivatives containing halogenated methyl groups and process of preparing them, in such a manner that all methyl groups, with the exception of one, are converted into trichloromethyl groups and the remaining methyl group into a dichloromethyl group. Thereupon, the chlorine atoms of the side chains are exchanged for fluorine by one of the known processes, such as, for instance, that described in German Patent 575,593.

The $CHF_2$-group is saponified in a smooth course and the desired benzaldehydes containing one or more trifluoromethyl groups are obtained with very good yields. They give the reactions usual for aldehydes: they are easily oxidised on exposure to air to the corresponding benzoic acids; they are capable of combining with bisulfite; they may easily be transformed by the action of chlorine into the corresponding carboxylic acid chlorides, and so on. They are valuable intermediates for the manufacture of dyestuffs, pharmaceutical products, fungicides and/or insecticides, and the like.

The following examples serve to illustrate the invention, but they are not intended to limit it thereto; the parts are by weight:

(1) 500 parts of ortho-trifluoromethylbenzalfluoride of the formula:

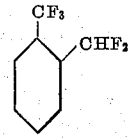

(obtainable by chlorinating ortho-xylene in the manner described in Beilstein, 4th edition, vol. V, page 365, to produce the ortho-xylene-pentachloride, which is a white crystalline mass, melting at 48° C., and subsequently exchanging the chlorine atoms for fluorine) which is a colorless liquid, boiling at 140–142° C. under atmospheric pressure, are introduced in an aluminium vessel into 1500 parts of sulfuric acid of 95 per cent. strength and the whole is heated, while stirring, to 90–120° C. After a short time, hydrogen fluoride begins to escape and the reaction is finished after 2 to 3 hours. The whole is poured into water and the ortho-trifluoromethyl-benzaldehyde thus obtained, corresponding with the following formula:

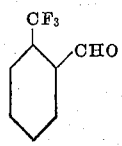

is distilled with steam. It is obtained with a yield of about 95 per cent. of the theoretical in the form of a colorless liquid which boils under a pressure of 16 mm. at 70° C. By the action of chlorine on ortho-trifluoromethyl-benzaldehyde, it is transformed into the ortho-trifluoromethyl-benzoylchloride which is a colorless, strongly smelling liquid, boiling at 90° C. under a pressure of 16 mm.

In a very similar manner the meta-trifluoromethyl-benzaldehyde may be obtained from meta-xylene-pentafluoride and the para-trifluoromethyl-benzaldehyde from para-xylene-pentafluoride. By using instead of the xylene-pentafluorides the corresponding nuclear substitution products, for instance mono- or di-halogen derivatives, there may be obtained, in the manner described in this example, the corresponding nuclear-substituted trifluoromethyl-benzaldehydes. For instance, there is obtained from 4-chloro-1-trifluoromethyl-2-benzalfluoride (colorless liquid boiling at 164-167° C. at ordinary pressure) the 4-chloro-1-trifluoromethyl-2-benzaldehyde, which forms a colorless liquid boiling at 82-86° C. under a pressure of 18 mm. By treating this aldehyde with chlorine it is transformed into the 4-chloro-1-trifluoromethyl-2-benzoylchloride which forms a colorless liquid boiling at 214-217° C. under ordinary pressure.

(2) By chlorinating pseudocumene until 8 chlorine atoms are absorbed, the pseudocumene-octachloride of the probable formula:

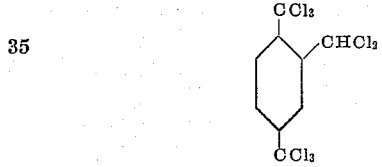

is obtained. It is white crystalline mass melting at 70° C. By exchanging the chlorine atoms for fluorine, there is obtained the pseudocumene-octafluoride forming a colorless liquid which boils under atmospheric pressure at 140-143° C.

1 part of this compound is saponified in a platinum vessel in a manner similar to that indicated in Example 1 with 3 parts of sulfuric acid of 95 per cent. strength; a bis-trifluoromethyl-benzaldehyde, of the probable formula:

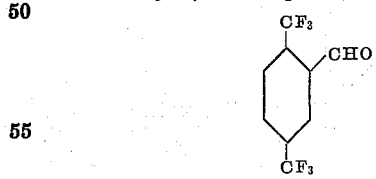

is obtained with a very good yield. This body forms a colorless liquid which boils under ordinary pressure at 170-172° C.

By treating the 2.5-bis-trifluoromethyl-benzaldehyde with chlorine, the corresponding 2.5-bis-trifluoromethyl-benzoyl-chloride is formed which is a colorless liquid, boiling under a vacuum of 10 mm. at 69-72° C.

In a similar manner there may be obtained from mesitylene-octafluoride the 3.5-bis-trifluoromethyl-benzaldehyde. By using instead of the octafluorides of trimethylbenzenes the nuclear substitution products thereof, for instance the mono- or di-halogen-derivatives, there are obtained therefrom, in the manner indicated in Example 2, the corresponding bis-trifluoromethyl-benzaldehydes substituted in the nucleus.

I claim:

1. The compounds of the following general formula:

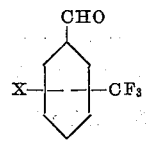

wherein X stands for a member of the group consisting of hydrogen, halogen and trifluoromethyl.

2. The compound of the following formula:

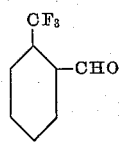

being a colorless liquid which boils at 70° C. under a pressure of 16 mm.

3. The compound of the following formula:

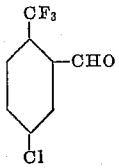

being a colorless liquid which boils at 82°-86° C. under a pressure of 18 mm.

4. The compound of the following formula:

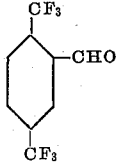

being a colorless liquid which boils at 170°-172° C. under ordinary pressure.

OTTO SCHERER.